(12) United States Patent
Liu et al.

(10) Patent No.: US 11,660,718 B2
(45) Date of Patent: May 30, 2023

(54) ADJUSTABLE DEVICE FOR REMOVING BURRS OF BACK CAVITY OF WHEEL

(71) Applicant: CITIC Dicastal CO., LTD., Qinhuangdao (CN)

(72) Inventors: Huiying Liu, Qinhuangdao (CN); Dong Guo, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 825 days.

(21) Appl. No.: 16/684,795

(22) Filed: Nov. 15, 2019

(65) Prior Publication Data

US 2020/0338684 A1    Oct. 29, 2020

(30) Foreign Application Priority Data

Apr. 29, 2019  (CN) .......................... 201910353228.1

(51) Int. Cl.
| | | |
|---|---|---|
| B24B 9/04 | (2006.01) | |
| B24B 27/00 | (2006.01) | |
| B24B 19/00 | (2006.01) | |
| B24B 29/00 | (2006.01) | |
| B24B 29/04 | (2006.01) | |
| B24B 5/44 | (2006.01) | |
| B24B 41/06 | (2012.01) | |

(52) U.S. Cl.
CPC .................. *B24B 9/04* (2013.01); *B24B 5/44* (2013.01); *B24B 19/00* (2013.01); *B24B 27/0023* (2013.01); *B24B 27/0076* (2013.01); *B24B 29/005* (2013.01); *B24B 29/04* (2013.01); *B24B 41/067* (2013.01)

(58) Field of Classification Search
CPC .. B24B 9/04; B24B 5/44; B24B 5/065; B24B 5/12; B24B 29/005; B24B 29/04; B24B 41/067; B24B 41/02; B24B 41/005; B24B 41/06; B24B 41/00; B24B 27/0076; B24B 27/0023; B24B 19/00; B60S 3/042; B08B 1/002; A46B 13/02; B60B 30/06
USPC ......................................... 451/109, 178, 190
See application file for complete search history.

(56) References Cited

U.S. PATENT DOCUMENTS

| | | | | |
|---|---|---|---|---|
| 10,010,992 | B2* | 7/2018 | Xue | B24B 5/40 |
| 10,112,279 | B2* | 10/2018 | Xue | B24B 21/12 |
| 10,160,085 | B2* | 12/2018 | Xue | B24B 29/04 |
| 10,213,890 | B2* | 2/2019 | Xue | B24B 9/04 |
| 10,232,485 | B2* | 3/2019 | Xue | B24B 21/006 |

FOREIGN PATENT DOCUMENTS

CN          102975095 A  *  3/2013

OTHER PUBLICATIONS

CN-102975095-A EspaceNet English Translation (Year: 2013).*

* cited by examiner

*Primary Examiner* — Joel D Crandall
*Assistant Examiner* — Makena S Markman
(74) *Attorney, Agent, or Firm* — IPro, PLLC (57) ABSTRACT

The present disclosure provides an adjustable device for removing burrs of a back cavity of a wheel. The adjustable device for removing the burrs of the back cavity of the wheel includes a frame provided with a rotary table inside, a support frame is fixedly connected to the rotary table, and a left rotary table and a right rotary table are arranged on the support frame. The device is ingenious in design, novel in conception, high in universality, short in cycle time and high in efficiency, and is suitable for removing burrs of wheels in different specifications.

7 Claims, 6 Drawing Sheets

ADJUSTABLE DEVICE FOR REMOVING BURRS OF BACK CAVITY OF WHEEL

CROSS-REFERENCE TO RELATED APPLICATION

This application claims the priority to Chinese Patent Application No. 201910353228.1, entitled "Adjustable Device for Removing Burrs of Back Cavity of Wheel", filed on Apr. 29, 2019, the entire content of which is hereby incorporated by reference.

TECHNICAL FIELD

The present disclosure relates to the technical field of burr removal of a back cavity of a wheel, and in particular relates to an adjustable device for removing burrs of a back cavity of a wheel.

BACKGROUND

After a wheel is machined, burrs of a back cavity of the wheel need to be removed, along with increasing of types of wheels, a large number of burr brushes need to be manufactured to be matched with the shapes of the back cavities of the wheels, and different burr brushes need to be replaced when burrs of the different wheels are removed, so that the production cost is high, and the field management difficulty is high. Based on the current situation, the patent provides an adjustable device for removing burrs of a back cavity of a wheel, the shapes of burr brushes can be adjusted according to different wheels to be similar to the contour of the back cavity of the wheel, thus, the burrs of the back cavity of the wheel can be removed accurately. When the device is adopted for removing burrs, there is no need to manufacture a large number of burr brushes, and when burrs of the different wheels need to be removed, only the contour of the burr brushes needs to be adjusted, so that the adjustable device for removing the burrs of the back cavity of the wheel is convenient, speedy, efficient and practical, and the production cost is reduced.

SUMMARY

In view of this, the present disclosure aims to provide an adjustable device for removing burrs of a back cavity of a wheel, so that there is no need to manufacture a large number of burr brushes, when burrs of different wheels need to be removed, only the contour of the burr brushes needs to be adjusted, and the adjustable device for removing the burrs of the back cavity of the wheel is convenient, speedy, efficient and practical, and the production cost is reduced.

In order to achieve the above object, the technical solution of the present disclosure is realized as follows:
an adjustable device for removing burrs of a back cavity of a wheel comprises a frame provided with a rotary table inside, the rotary table is fixedly connected with a support frame, to a left rotary table and a right rotary table are arranged on the support frame, an M-shaped burr brush is arranged on the left rotary table, the width and height of the M-shaped burr brush can be adjusted by a left adjusting component, an N-shaped burr brush is arranged on the right rotary table, and the width and height of the N-shaped burr brush can be adjusted by a right adjusting component.

Further, the left adjusting component comprises a supporting seat and first guide rails which are fixed on the left rotary table, a first sliding block is arranged on the first guide rails, one end of the first sliding block is fixedly connected to the M-shaped burr brush, a first electric cylinder is fixed at the other end of the first sliding block, and the output end of the first electric cylinder is connected with the supporting seat.

Further, the supporting seat is provided with second guide rails and a first rack, the bottom of the first rack is mounted on the second guide rails through sliding sleeves, a first gear is arranged on the upper portion of the first rack, the first gear is fixedly connected with a first cylinder, and the output end of the first cylinder is slidably connected to the M-shaped burr brush; and a second cylinder is arranged at the end, which is away from the first electric cylinder, of the first rack, and the output end of the second cylinder is connected to a first fixed plate fixed on the left rotary table.

Further, the M-shaped burr brush comprises an outer-ring belt and an outer-ring burr brush covering the outer surface of the outer-ring belt, a slide way is arranged on the inner side of the outer-ring belt, a first steel ball is mounted at the output end of the first cylinder, and the first steel ball is mounted in the slide way.

Further, a first gear support is fixed on the left rotary table, the first gear support is provided with a first roll shaft, and the first gear is mounted on the first roll shaft.

Further, the right adjusting component comprises a third fixed plate, fifth guide rails, an adjusting cylinder, sixth guide rails and a fourth fixed plate which are sequentially fixed on the right rotary table, the third fixed plate and the fifth guide rails as well as the fourth fixed plate and the sixth guide rails are symmetrically arranged on two sides of the adjusting cylinder, a third sliding block is arranged on the fifth guide rails, the third sliding block is connected with the third fixed plate through a first spring, a fourth sliding block is arranged on the sixth guide rails, and the fourth sliding block is connected with the fourth fixed plate through a second spring.

Further, a left adjusting cylinder and a right adjusting cylinder are symmetrically hinged to the adjusting cylinder in the left-right direction, and the output end of the adjusting cylinder, the output end of the left adjusting cylinder and the output end of the right adjusting cylinder are successively hinged to the N-shaped burr brush.

Further, the left rotary table is rotatably connected to the support frame.

Further, two sides of the left rotary table are fixedly connected with a left roll shaft, the left rotary table is connected to the support frame through the left roll shaft, a second driven chain wheel is fixed on the left roll shaft, the rotary table is fixedly connected with a second servo motor, the output end of the second servo motor is fixedly connected with a second driving chain wheel, and the second driving chain wheel is connected with the second driven chain wheel through a second chain.

Compared with the prior art, the adjustable device for removing the burrs of the back cavity of the wheel in the present disclosure has the following advantages.

1. The back cavity of the wheel is divided into three sections including an inner ring, a middle ring and an outer ring in the radial direction, by adjusting the M-shaped burr brush on the left side, the shape of the M-shaped burr brush can be similar to the contour of the inner ring and the outer ring of the back cavity of the wheel; by adjusting the N-shaped burr brush on the right side, the shape of the N-shaped burr brush can be similar to the contour of the middle ring of the back cavity of the wheel; and when rotating, the burr brushes on the to left side and the right side are superposed, and the contour of the burr brushes is similar to that of the back cavity of the wheel, thus, the burrs of the back cavity of the wheel can be removed accurately.

2. The second servo motor can drive the left rotary table to overturn.

3. The first electric cylinder can push the first sliding block to move in the left-right direction, and thus, the widths of the burr brushes are adjusted to be matched with back cavities of wheels in different widths; the second cylinder can push the first rack to move in the left-right direction, and the first rack is engaged with the first gear, thus, the first gear rotates, and the position of the first steel ball is adjusted; and the radial height of the first steel ball can be controlled through the first cylinder. Through combined adjustment of the first electric cylinder, the first cylinder and the second cylinder, the shape of the outer-ring burr brush can be similar to that of the outer ring of the back cavity of the wheel, and shape following is realized. The right end of the M-shaped burr brush is used for removing the burrs of the inner ring of the back cavity of the wheel, and the structure of the right end of the M-shaped burr brush is consistent and symmetric to the left end of the M-shaped burr brush. Through combined adjustment of the second electric cylinder, the third cylinder and the fourth cylinder, the shape of the inner-ring burr brush can be similar to that of the inner ring of the back cavity of the wheel, and shape following is realized.

4. Through combined adjustment of the left adjusting cylinder, the adjusting cylinder and the right adjusting cylinder, three-point fitting is implemented, the shape of the middle-ring burr brush can be similar to the shape of the middle ring of the back cavity of the wheel, and shape following is realized.

5. When the device is adopted for removing the burrs, there is no need to manufacture a large number of burr brushes, and when burrs of different wheels need to be removed, only the contour of the burr brushes needs to be adjusted, so that the device is ingenious in design, novel in conception, high in universality, short in cycle time and high in efficiency, and is suitable for removing burrs of wheels in different specifications.

BRIEF DESCRIPTION OF THE DRAWINGS

The accompanying drawings, which are incorporated in and constitute a part of the present disclosure, provide a further understanding of the present disclosure, and schematic embodiments and the description thereof serve to explain the present disclosure and are not to be construed as unduly limiting the present disclosure. In the drawings.

Reference numerals: 1—frame, 2—cylinder, 3—guiding column, 4—guide sleeve, 5—lifting table, 6—motor support, 7—first servo motor, 8—first shaft, 9—first driving chain wheel, 10—first chain, 11—first bearing block, 12—first bearing, 13—rotating shaft, 14—first driven chain wheel, 15—rotating disc, 16—second bearing block, 17—second bearing, 18—inner shaft, 19—rotary table, 20—support frame, 21—second servo motor, 22—second driving chain wheel, 23—second chain, 24—second driven chain wheel, 25—left roll shaft, 26—left rotary table, 27—first guide rail, 28—first sliding block, 29—first electric cylinder, 30—supporting seat, 31—second guide rail, 32—first rack, 33—first gear support, 34—first roll shaft, 35—first gear, 36—first cylinder, 37—first steel ball, 38—second cylinder, 39—first fixed plate, 40—outer-ring belt, 41—outer-ring burr brush, 42—third guide rail, 43—second sliding block, 44—second electric cylinder, 45—fourth guide rail, 46—second rack, 47—second gear support, 48—second gear, 49—third cylinder, 50—second steel ball, 51—fourth cylinder, 52—second fixed plate, 53—inner-ring belt, 54—inner-ring burr brush, 55—inner cylinder, 56—inner guide rail, 57—third servo motor, 58—inner sliding block, 59—expanding cylinder, 60—pull rod, 61—expanding core, 62—expanding sleeve, 63—step-shaped positioning disc, 64—third driven chain wheel, 65—right roll shaft, 66—right rotary table, 67—third fixed plate, 68—fifth guide rail, 69—first spring, 70—third sliding block, 71—fourth fixed plate, 72—sixth guide rail, 73—second spring, 74—fourth sliding block, 75—adjusting cylinder, 76—left adjusting cylinder, 77—right adjusting cylinder, 78—middle-ring belt, and 79—middle-ring burr brush, 80—wheel.

DETAILED DESCRIPTION

It should be noted that embodiments of the present disclosure and features of the embodiments may be combined with one another without conflict.

The technical solution of the present disclosure will be described clearly and completely hereinafter with reference to the accompanying drawings and in combination with embodiments, and obviously, the embodiments described are only a part of embodiments of the present disclosure, and are not all of embodiments thereof. Based on the embodiments of the present disclosure, all other embodiments obtained by a person of ordinary skill in the art without involving any inventive effort fall within the protection scope of the present disclosure.

An adjustable device for removing burrs of a back cavity of a wheel according to embodiments of the present disclosure will be described with reference to FIG. 1 to FIG. 6 and in conjunction with embodiments.

As shown in FIG. 1 to FIG. 6, the adjustable device for removing the burrs of the back cavity of the wheel includes structures such as a frame 1, cylinders 2, guiding columns 3, guide sleeves 4, a lifting table 5, a motor support 6, a first servo motor 7, a first shaft 8, a first driving chain wheel 9, a first chain 10, a first bearing block 11, a first bearing 12, a rotating shaft 13, a first driven chain wheel 14, a rotating disc 15, a second bearing block 16, a second bearing 17, an inner shaft 18, a rotary table 19, a support frame 20, a second servo motor 21, a second driving chain wheel 22, a second chain 23, a second driven chain wheel 24, a left roll shaft 25, a left rotary table 26, first guide rails 27, a first sliding block 28, a first electric cylinder 29, a supporting seat 30, second guide rails 31, a first rack 32, a first gear support 33, a first roll shaft 34, a first gear 35, a first cylinder 36, a first steel ball 37, a second cylinder 38, a first fixed plate 39, an outer-ring belt 40, an outer-ring burr brush 41, third guide rails 42, a second sliding block 43, a second electric cylinder 44, fourth guide rails 45, a second rack 46, a second gear support 47, a second gear 48, a third cylinder 49, a second steel ball 50, a fourth cylinder 51, a second fixed plate 52, an inner-ring belt 53, an inner-ring burr brush 54, an inner cylinder 55, inner guide rails 56, a third servo motor 57, an inner sliding block 58, an expanding cylinder 59, a pull rod 60, an expanding core 61, an expanding sleeve 62, a step-shaped positioning disc 63, a third driven chain wheel 64, a right roll shaft 65, a right rotary table 66, a third fixed plate 67, fifth guide rails 68, a first spring 69, a third sliding block 70, a fourth fixed plate 71, sixth guide rails 72, a second spring 73, a fourth sliding block 74, an adjusting cylinder 75, a left adjusting cylinder 76, a right adjusting cylinder 77, a middle-ring belt 78 and a middle-ring burr brush 79.

The adjustable device for removing the burrs of the back cavity of the wheel consists of two systems, and the first system is a wheel positioning and clamping system for completing axial positioning, radial positioning and clamping of the wheel. The second system is a burr brush adjusting system, the back cavity of the wheel is divided into three sections including an inner ring, a middle ring and an outer ring in the radial direction. The burr brush on the left side is M-shaped, and through adjustment, the shape of the burr brush on the left side can be similar to the contour of the inner ring and the outer ring of the back cavity of the wheel; the burr brush on the right side is N-shaped, and through adjustment, the shape of the burr brush on the right side can be similar to the contour of the middle ring of the back cavity of the wheel; and when rotating, the burr brushes on the left side and the right side are superposed, the contour of the burr brushes is similar to that of the back cavity of the wheel, and the burrs of the back cavity of the wheel can be removed accurately.

The cylinders 2 and the guiding columns 3 are fixed on the bottom of the frame 1, the output ends of the cylinders 2 are connected with the lifting table 5, the guide sleeves 4 are fixed on the lifting table 5, and the guide sleeves 4 are matched with the guiding columns 3. Under the guiding effect of the guiding columns 3, the cylinders 2 control the lifting table 5 to move in the up-down direction. The first servo motor 7 is fixed on the lifting table 5 through the motor support 6, the output end of the motor is connected with the first shaft 8, and the first driving chain wheel 9 is mounted on the first shaft 8. The first bearing block 11 is mounted on the lifting table 5, the rotating shaft 13 is mounted on the first bearing block 11, the first driven chain wheel 14 is mounted on the rotating shaft 13, the first driving chain wheel 9 is connected with the first driven chain wheel 14 through the first chain 10, the rotating disc 15 is mounted on the rotating shaft 13, and the rotation of the rotating disc 15 can be controlled by the first servo motor 7. The second bearing block 16 is fixed on the rotating disc 15, the inner shaft 18 is mounted in the second bearing block 16, the inner cylinder 55 is fixed on the bottom of the cavity of the inner shaft 18, the output end of the inner cylinder 55 is connected with the inner sliding block 58, the inner sliding block 58 is mounted on the inner guide rails 56, and the inner guide rails 56 are fixed on the side walls of the cavity of the inner shaft 18. Under the guiding effect of the inner guide rails 56, the inner cylinder 55 can control the inner sliding block 58 to move in the up-down direction. The expanding cylinder 59 is fixed on the inner sliding block 58, the output end of the expanding cylinder 59 is connected with the pull rod 60, the pull rod 60 is connected with the expanding core 61, and the expanding core 61 is matched with the expanding sleeve 62. The wheel is placed on the step-shaped positioning disc 63, so that axial positioning of the wheel can be realized; the step-shaped positioning disc 63 is provided with positioning circular truncated cone surfaces with different diameters, and suitable step circular truncated cone surfaces can be selected for wheels with different outer diameters. The expanding cylinder 59 can pull the expanding core 61 for enabling the expanding sleeve 62 to expand a central hole of the wheel, so that clamping of the wheel is realized while radial positioning is realized. The wheel positioning and clamping system is used for completing axial positioning, radial positioning and clamping of the wheel.

The rotary table 19 is fixed on the second bearing block 16, the rotary table 19 is provided with a left brush system and a right brush system, the left brush system is M-shaped, and through adjustment, the shape of the burr brush can be similar to the contour of the inner ring and the outer ring of the back cavity of the wheel; and the right brush system is N-shaped, and through adjustment, the shape of the burr brush can be similar to the contour of the middle ring of the back cavity of the wheel.

Figure 1:
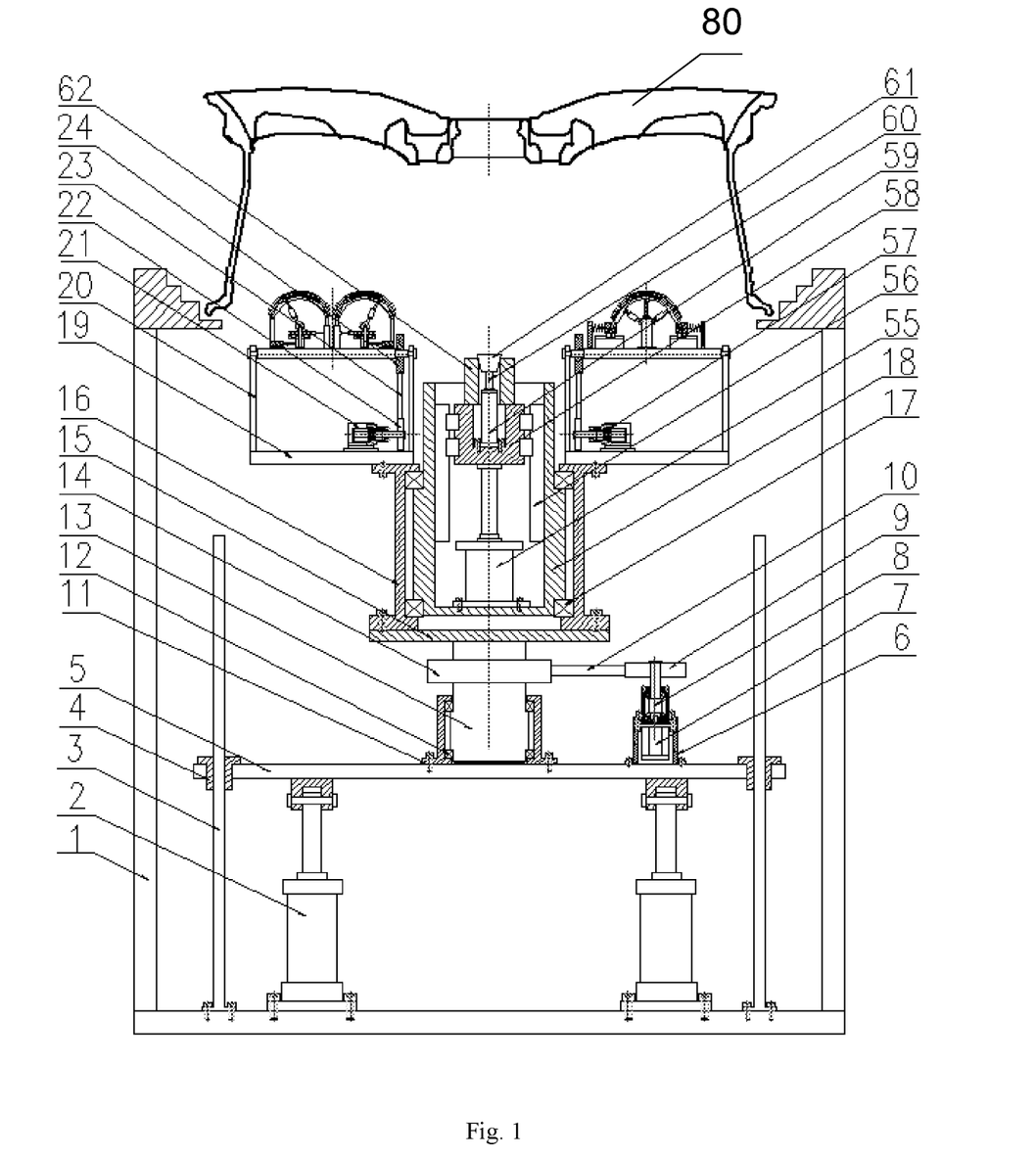
FIG. 1 illustrates a front view of an adjustable device for removing burrs of a back cavity of a wheel according to some embodiment of the present disclosure.
Figure 2:
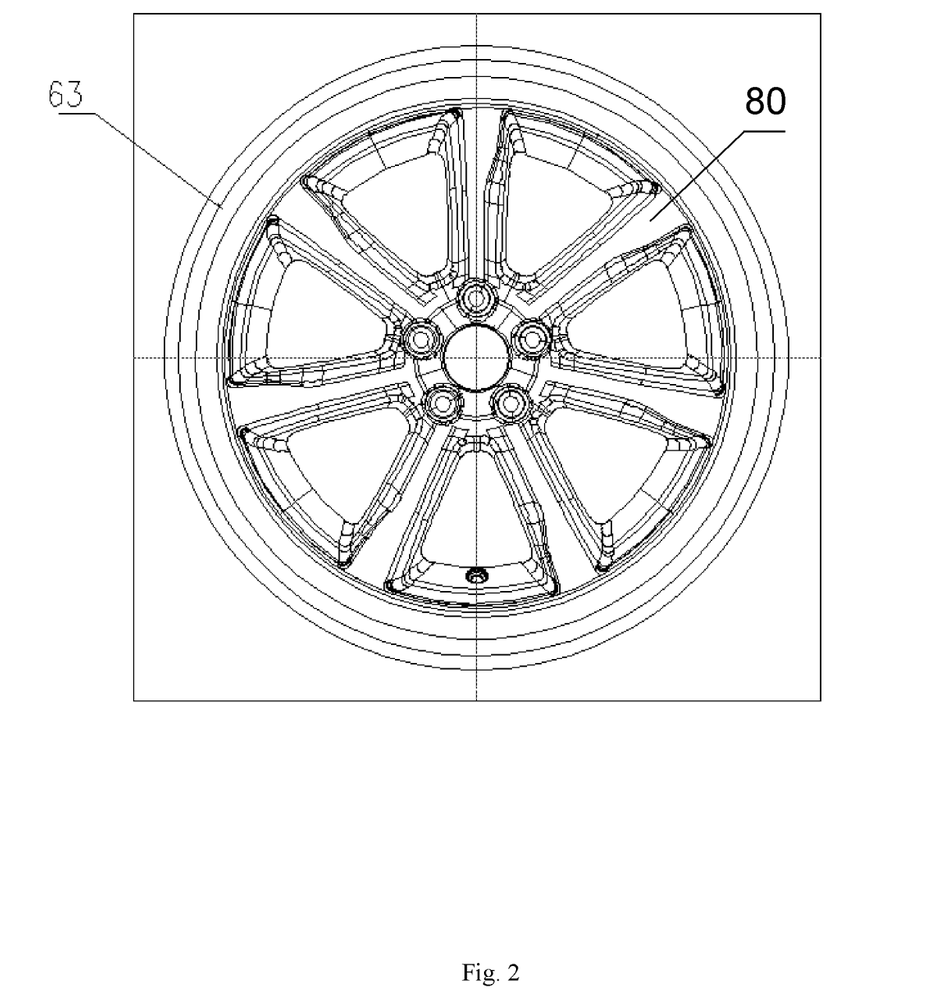
FIG. 2 illustrates a top view of the adjustable device for removing the burrs of the back cavity of the wheel according to some embodiment of the present disclosure.
Figure 3:
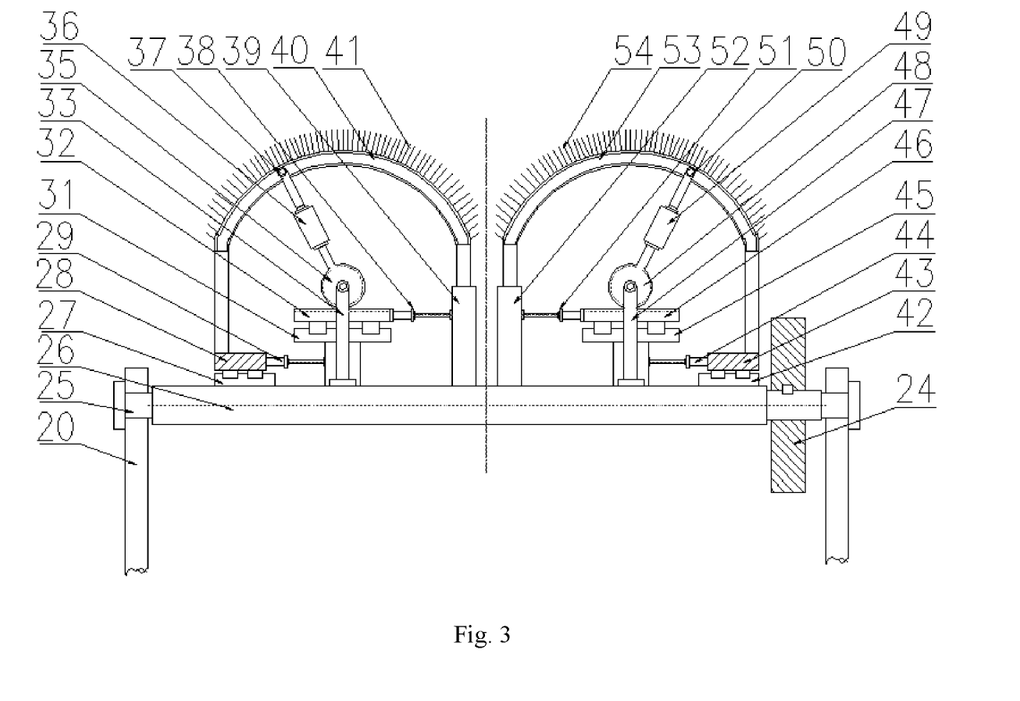
FIG. 3 illustrates an enlarged front view of a left brush system of the adjustable device for removing the burrs of the back cavity of the wheel according to some embodiment of the present disclosure.
Figure 4:
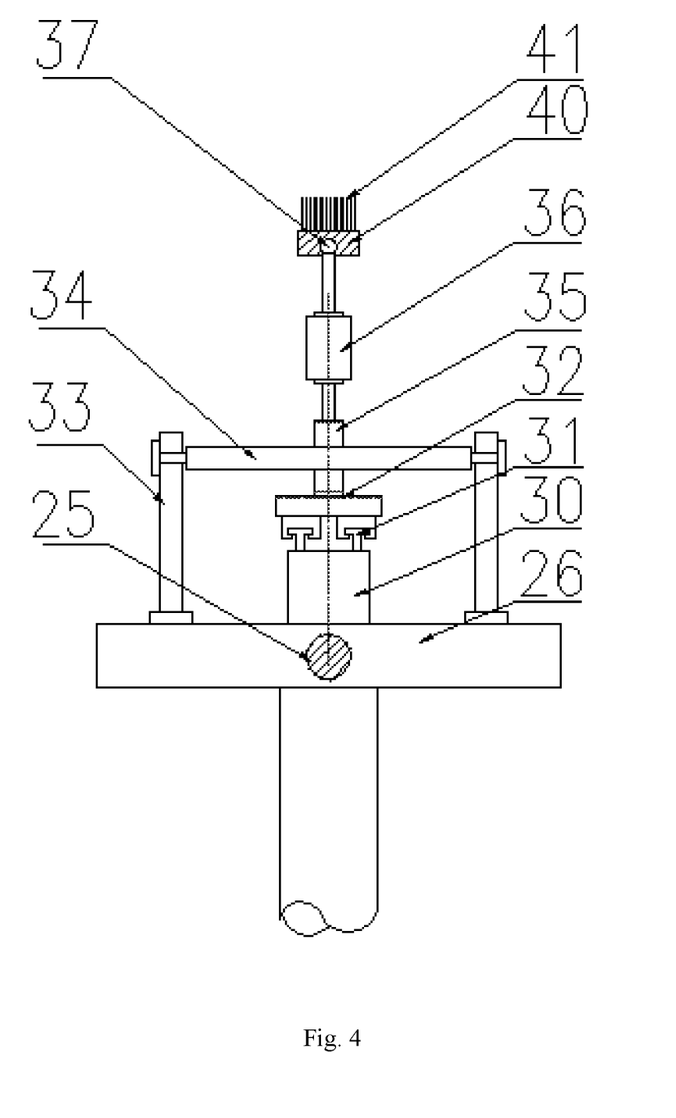
FIG. 4 illustrates an enlarged left side view of the left brush system of the adjustable device for removing the burrs of the back cavity of the wheel according to some embodiment of the present disclosure.

The left brush system includes the following structures: the support frame 20 is fixed on the rotary table 19, the left roll shaft 25 is mounted on the support frame 20, and the to second driven chain wheel 24 is mounted on the left roll shaft 25. The second servo motor 21 is fixed on the rotary table 19, the second driving chain wheel 22 is mounted at the output end of the second servo motor 21, the second driving chain wheel 22 is connected with the second driven chain wheel 24 through the second chain 23, the left rotary table 26 is connected with the left roll shaft 25, and the second servo motor 21 can drive the left rotary table 26 to overturn. The left rotary table 26 is provided with the M-shaped burr brush which has a symmetric structure, the left end of the M-shaped burr brush is used for removing burrs of the outer ring of the back cavity of the wheel, and the right end of the M-shaped burr brush is used for removing burrs of the inner ring of the back cavity of the wheel. The two first guide rails 27 are fixed on the left rotary table 26, the first sliding block 28 is mounted on the first guide rails 27, the first electric cylinder 29 is fixed on the sliding block 28, the output end of the first electric cylinder 29 is connected with the supporting seat 30, and the supporting seat 30 is fixed on the left rotary table 26. The two second guide rails 31 are fixed on the supporting seat 30, the sliding sleeves are mounted on the bottom of the first rack 32, the first rack 32 is mounted on the second guide rails 31 through the sliding sleeves, the first rack 32 is matched with the first gear 35, the first gear 35 is mounted on the first roll shaft 34, the first roll shaft 34 is mounted on the first gear support 33, and the first gear support 33 is fixed on the left rotary table 26. The first cylinder 36 is fixedly connected with the first gear 35, the first steel ball 37 is mounted at the output end of the first cylinder 36, and the first steel ball 37 is mounted in the slide way of the outer-ring belt 40. The surface of the outer-ring belt 40 is covered with the outer-ring burr brush 41, the left end of the outer-ring belt 40 is connected with the first sliding block 28, the right end of the outer-ring belt 40 is connected with the first fixed plate 39, and the first fixed plate 39 is fixed on the left rotary table 26. The second cylinder 38 is fixed on the first rack 32, and the output end of the second cylinder 38 is connected with the first fixed plate 39. The first electric cylinder 29 can push the first sliding block 28 to move in the left-right direction, thus, the width of the burr brush is adjusted to be matched with back cavities of wheels in different widths; the second cylinder 38 can push the first rack 32 to move in the left-right direction, and the first rack 32 is engaged with the first gear 35, so that the first gear 35 rotates, and the position of the first steel ball 37 is adjusted; and the first cylinder 36 can control the radial height of the first steel ball 37. Through combined adjustment of the first electric cylinder 29, the first cylinder 36 and the second cylinder 38, the shape of the outer-ring burr brush 41 can be similar to that of the outer ring of the back cavity of the wheel, and shape following is realized. The right end of the M-shaped burr brush is used for removing the burrs of the inner ring of the back cavity of the wheel, and the structure of the right end of the M-shaped burr brush is consistent and symmetric to the structure of the left end of the M-shaped burr brush. Through combined adjustment of the second electric cylinder 44, the third cylinder 49 and the fourth cylinder 51, the shape of the inner-ring burr brush 54 can be similar to that of the inner ring of the back cavity of the wheel, and shape following is realized.

Figure 5:
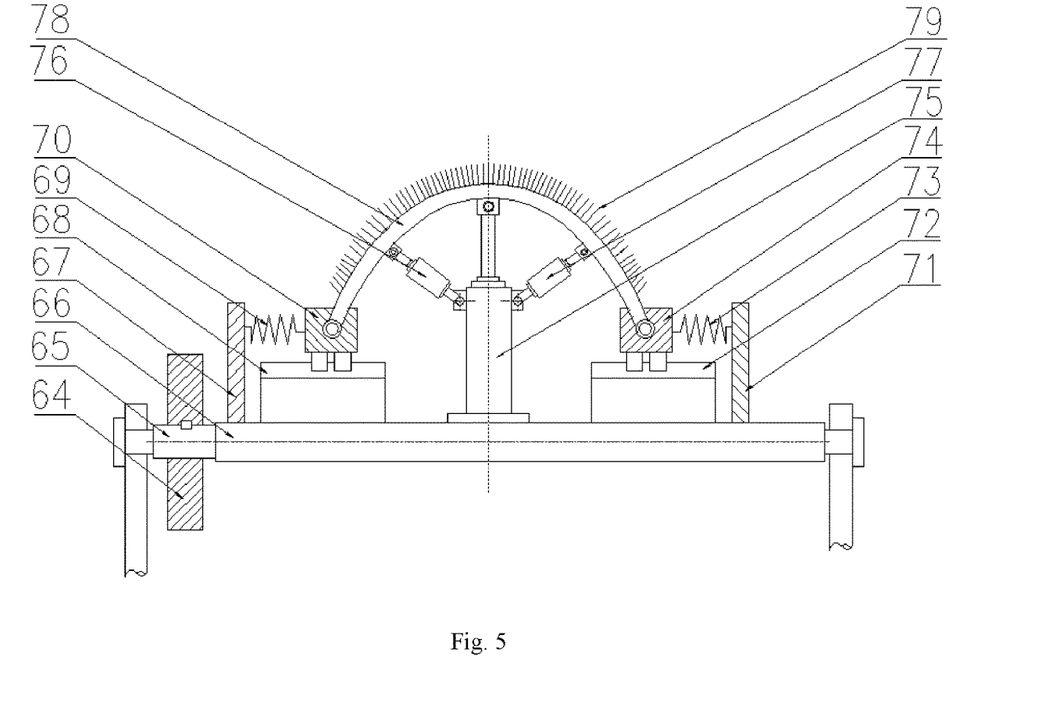
FIG. 5 illustrates an enlarged front view of a right brush system of the adjustable device for removing the burrs of the back cavity of the wheel according to some embodiment of the present disclosure.
Figure 6:
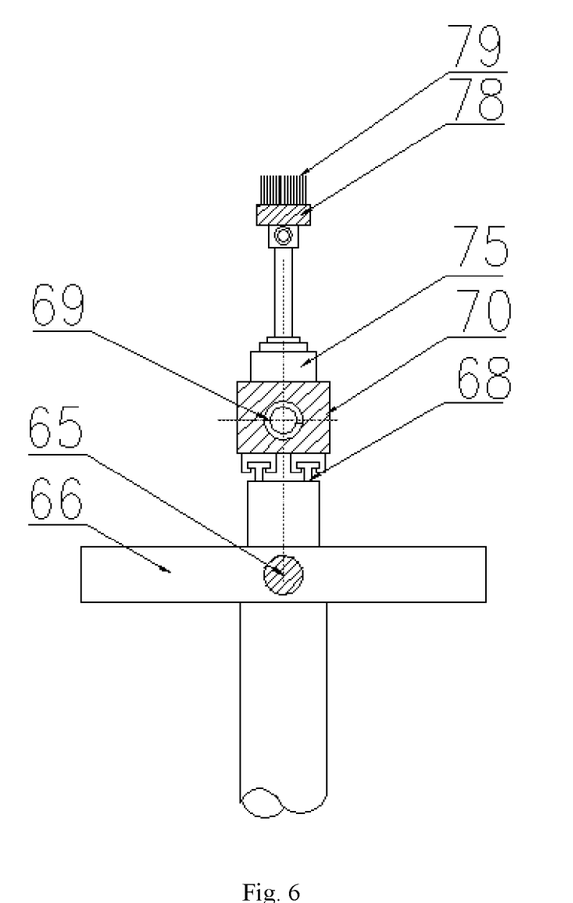
FIG. 6 illustrates an enlarged left side view of the right brush system of the adjustable device for removing the burrs of the back cavity of the wheel according to some embodiment of the present disclosure.

The right brush system includes the following structures: the overturning structure of the right rotary table 66 is consistent with the overturning structure of the left rotary table 26, namely, the support frame is fixed on the rotary table, the right roll shaft 65 is mounted on the support frame, and the third driven chain wheel 64 is mounted on the right roll shaft 65. The third servo motor 57 is fixed on the rotary table, a third driving chain wheel is mounted at the output end of the third servo motor 57, the third driving chain wheel is connected with the third driven chain wheel 64 through a third chain, the right rotary table 66 is connected with the right roll shaft 65, and the third servo motor 57 can drive the right rotary table 66 to overturn. The third fixed plate 67 and the fourth fixed plate 71 are symmetrically mounted on the right rotary table 66, the third sliding block 70 is connected with the third fixed plate 67 through the first spring 69, and the fourth sliding block 74 is connected with the fourth fixed to plate 71 through the second spring 73. The third sliding block 70 is mounted on the fifth guide rails 68, the fourth sliding block 74 is mounted on the sixth guide rails 72, and the fifth guide rails 68 and the sixth guide rails 72 are fixed on the right rotary table 66. The left end of the middle-ring belt 78 is connected with the third sliding block 70, the right end of the middle-ring belt 78 is connected with the fourth sliding block 74, and the outer surface of the middle-ring belt 78 is covered with the middle-ring burr brush 79. The adjusting cylinder 75 is fixed in the middle of the right rotary table 66, the output end of the adjusting cylinder 75 is fixedly connected with the middle-ring belt 78, the left adjusting cylinder 76 and the right adjusting cylinder 77 are symmetrically hinged to the adjusting cylinder 75 in the left-right direction, the output end of the left adjusting cylinder 76 is hinged to the middle-ring belt 78, and the output end of the right adjusting cylinder 77 is also hinged to the middle-ring belt 78. Through combined adjustment of the left adjusting cylinder 76, the adjusting cylinder 75 and the right adjusting cylinder 77, three-point fitting is realized, the shape of the middle-ring burr brush 79 can be similar to the shape of the middle ring of the back cavity of the wheel, and shape following is realized.

The operating process of the adjustable device for removing the burrs of the back cavity of the wheel is as follows: firstly, the shape of the burr brushes is adjusted according to the produced wheel so as to be similar to the shape of the back cavity of the wheel, and the wheel is placed on the step-shaped positioning disc 63 through a manipulator, thus, axial positioning is realized; then the cylinders 2 are started to drive the lifting table 5 to ascend, so that the burr brushes are in contact with the back cavity of the wheel; then the inner cylinder 55 is started to drive the inner sliding block 58 to ascend, thus, the expanding sleeve 62 is positioned in the central hole of the wheel, and the expanding cylinder 59 pulls the expanding core 61 to enable the expanding sleeve 62 to expand the central hole of the wheel, so that clamping of the wheel is realized while radial positioning is realized; and then the first servo motor 7 is started to drive the rotating shaft 13 to rotate, the rotating shaft 13 drives the rotating disc 15 to rotate. Because the expanding sleeve 62 on the inner shaft 18 is fixedly connected with the wheel, frictional force exists on the end surface of the inner wheel edge of the wheel and the surface of the step-shaped positioning disc 63, and the inner shaft 18 does not rotate when the rotating disc 15 rotates. The rotary table 19 can be driven to rotate by the rotation of the rotating disc 15, thus, the burr brushes rotate circumferentially. Then the second servo motor 21 and the third servo motor 57 are started for separately driving the left rotary table 26 and the right rotary table 66 to overturn, thus, the burr brush can further overturn for removing burrs in multiple directions at multiple angles while achieving circumferential rotation.

Compared with the prior art, the adjustable device for removing the burrs of the back cavity of the wheel in the present disclosure has the following advantages: when the device is adopted for removing the burrs, there is no need to manufacture a large number of burr brushes, and when the burrs of the different wheels need to be removed, only the contour of the burr brushes needs to be adjusted, and the adjustable device for removing the burrs of the back cavity of the wheel is skillful in design, novel in conception, high in universality, short in cycle time and high in efficiency, and is suitable for removing burrs of wheels in different specifications.

While exemplary embodiments are described above, it is not intended that these embodiments describe all possible forms of the present disclosure. Rather, the words used in the specification are words of description rather than limitation, and it is understood that variations may be made without departing from the spirit and scope of the present disclosure. Additionally, the features of various implementing embodiments may be combined to form further embodiments of the present disclosure.

What is claimed is:

1. An adjustable device for removing burrs of a back cavity of a wheel, comprising:
    a frame provided with a rotary table inside, wherein a support frame is fixedly connected to the rotary table;
    a left rotary table and a right rotary table are arranged on the support frame;
    an M-shaped burr brush is arranged on the left rotary table, the width and height of the M-shaped burr brush can be adjusted by a left adjusting component; and
    an N-shaped burr brush is arranged on the right rotary table, and the width and height of the N-shaped burr brush can be adjusted by a right adjusting component,
    wherein the left adjusting component comprises:
        a supporting seat; and
        first guide rails which are fixed on the left rotary table, wherein a first sliding block is arranged on the first guide rails, one end of the first sliding block is fixedly connected to the M-shaped burr brush, a first electric cylinder is fixed at the other end of the first sliding block, and the output end of the first electric cylinder is connected with the supporting seat, wherein the right adjusting component comprises:
a third fixed plate;
fifth guide rails;
an adjusting cylinder;
sixth guide rails;
a fourth fixed plate;
a third sliding block arranged on the fifth guide rails, the third sliding block is connected with the third fixed plate through a first spring; and
a fourth sliding block arranged on the sixth guide rails, and the fourth sliding block is connected with the fourth fixed plate through a second spring,
wherein the third fixed plate, the fifth guide rails, the adjusting cylinder, the sixth guide rails and the fourth fixed plate are sequentially fixed on the right rotary table,
the combination of the third fixed plate and the fifth guide rails and the combination of the fourth fixed plate and the sixth guide rails are symmetrically arranged with respect to the adjusting cylinder.

2. The adjustable device for removing burrs of a back cavity of a wheel according to claim 1, wherein:
the supporting seat is provided with second guide rails and a first rack, the bottom of the first rack is mounted on the second guide rails through sliding sleeves, a first gear is arranged on the upper portion of the first rack, the first gear is fixedly connected with a first cylinder, and the output end of the first cylinder is slidably connected to the M-shaped burr brush; and
a second cylinder is arranged at the end, which is away from the first electric cylinder, of the first rack, and the output end of the second cylinder is connected to a first fixed plate fixed on the left rotary table.

3. The adjustable device for removing burrs of a back cavity of a wheel according to claim 2, wherein the M-shaped burr brush comprises:

an outer-ring belt; and
an outer-ring burr brush covering the outer surface of the outer-ring belt,
a slide way is arranged on the inner side of the outer-ring belt, and a first steel ball is mounted at the output end of the first cylinder, and is mounted in the slide way.

4. The adjustable device for removing burrs of a back cavity of a wheel according to claim 2, wherein: a first gear support is fixed on the left rotary table, a first roll shaft is arranged on the first gear support, and the first gear is mounted on the first roll shaft.

5. The adjustable device for removing burrs of a back cavity of a wheel according to claim 1, wherein:
a left adjusting cylinder and a right adjusting cylinder are symmetrically hinged to the adjusting cylinder in the left-right direction; and
the output end of the adjusting cylinder, the output end of the left adjusting cylinder and the output end of the right adjusting cylinder are successively hinged to the N-shaped burr brush.

6. The adjustable device for removing burrs of a back cavity of a wheel according to claim 1, wherein the left rotary table is rotatably connected to the support frame.

7. The adjustable device for removing burrs of a back cavity of a wheel according to claim 6, wherein: two sides of the left rotary table are fixedly connected with a left roll shaft, the left rotary table is connected to the support frame through the left roll shaft, a second driven chain wheel is fixed on the left roll shaft, the rotary table is fixedly connected with a second servo motor, the output end of the second servo motor is fixedly connected with a second driving chain wheel, and the second driving chain wheel is connected with the second driven chain wheel through a second chain.

* * * * *